(12) United States Patent
Rao et al.

(10) Patent No.: US 9,842,003 B2
(45) Date of Patent: Dec. 12, 2017

(54) MASTER BASEBOARD MANAGEMENT CONTROLLER ELECTION AND REPLACEMENT SUB-SYSTEM ENABLING DECENTRALIZED RESOURCE MANAGEMENT CONTROL

(71) Applicant: DELL PRODUCTS, L.P., Round Rock, TX (US)

(72) Inventors: Balaji Bapu Gururaja Rao, Austin, TX (US); Paul W. Vancil, Austin, TX (US); Timothy M. Lambert, Austin, TX (US); John R. Stuewe, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 426 days.

(21) Appl. No.: 14/509,014

(22) Filed: Oct. 7, 2014

(65) Prior Publication Data

US 2016/0099886 A1 Apr. 7, 2016

(51) Int. Cl.
*G06F 9/50* (2006.01)
*H04L 12/911* (2013.01)

(52) U.S. Cl.
CPC .......... *G06F 9/5061* (2013.01); *H04L 47/783* (2013.01); *H04L 47/826* (2013.01); *G06F 2209/505* (2013.01)

(58) Field of Classification Search
CPC .... G06F 9/00; G06F 9/5061; G06F 2209/505; H04L 47/783; H04L 47/826
See application file for complete search history.

(56) References Cited

U.S. PATENT DOCUMENTS

| 7,685,281 | B1 * | 3/2010 | Saraiya | G06F 13/387 370/392 |
| 7,860,961 | B1 * | 12/2010 | Finkelstein | H04L 12/4641 709/201 |
| 7,979,862 | B2 * | 7/2011 | Miller | G06F 9/5083 709/201 |
| 2011/0153798 | A1 * | 6/2011 | Groenendaal | H04L 63/20 709/223 |

* cited by examiner

*Primary Examiner* — Michael C Lai
(74) *Attorney, Agent, or Firm* — Isidore PLLC (57) ABSTRACT

An information handling system and method of a master baseboard management controller election and replacement sub-system (MBMCERS) enables decentralized resource management control via the elected master baseboard management controller (BMC). The information handling system includes a plurality of server nodes, each having a BMC capable of controlling a plurality of shared common resources among the plurality of server nodes. Each BMC has a unique BMC identification. A master register stores BMC identification that has been elected as the master BMC to control the shared common resources. The master BMC relinquishes control of the shared common resources when the master register is placed in the reset state. When the master register is in the reset state, any one of the BMCs can elect to become a replacement master BMC.

22 Claims, 5 Drawing Sheets

MASTER BASEBOARD MANAGEMENT CONTROLLER ELECTION AND REPLACEMENT SUB-SYSTEM ENABLING DECENTRALIZED RESOURCE MANAGEMENT CONTROL

BACKGROUND

1. Technical Field

The present disclosure generally relates to decentralized resource management control and in particular to a master baseboard management controller election and replacement sub-system to manage shared common resources in an information handling system of multiple server nodes.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a highly demanding computing and information handling environment requiring multiple computing systems, many are turning to the high density server which provides an information handling system comprised of several server nodes in a single rack or chassis. The high density server contains shared resources such as power supplies, sensors, fans, KVMs, shared storage and I/O subsystem. Each server node is configured to share the resources utilizing the chassis management controller (CMC), which eases the configuration process from manual configuration by person. The CMC controls and monitors the shared resources on behalf of the server nodes. The sharing of key resources like power supplies and fans allows for more compact chassis and server nodes. In order to have a built-in reliability for the control and monitoring of the shared resources, the CMC is often designed with redundancy which can be costly in both cost and space to the design of the chassis.

Each server node contains a baseboard management controller (BMC) that is a management subsystem that defines a set of common interfaces to the hardware and firmware that is used to monitor the server node's health and manage the subsystem. The BMC includes a specialized microcontroller embedded on the motherboard of a computer, generally a server. The BMC manages the interface between system management software and hardware. Different types of sensors that monitor the hardware report to the BMC on parameters such as temperature, cooling fan speeds, power status, operating system (OS) status, etc. The BMC monitors the sensors and can send alerts to a system administrator if any of the parameters do not stay within predefined limits. The alerts indicate a potential failure of the system. Additionally, the BMC can send health status to a system administrator.

The redundancy of the CMC to control and monitor the shared common resources adds not only extra cost, but also lowers the reliability of the chassis structure when operational complexity of additional hardware and cables in the chassis drives higher failure rates. Often, the server nodes are designed to be compatible to the complex CMC. It would be advantageous to provide a less complicated and more reliable chassis control structure.

BRIEF SUMMARY

Disclosed are an information handling system and method for implementing a master baseboard management controller election and replacement sub-system. In accordance to the present disclosure, a plurality of server nodes in a high density server system of an information handling system shares common resources and elects a master controller from among the multiple baseboard management controllers to control the shared common resources.

According to a specific example embodiment of the present disclosure, an information handling system may include a plurality of server nodes. Each node includes a baseboard management controller (BMC) capable of controlling shared common resources when elected as the master. Each BMC has a unique BMC identification. When the master BMC is elected, the identification of the master BMC is stored in a master register. The master BMC updates a master heartbeat register and periodically refreshes a watchdog timer. The watchdog timer tracks elapsed time since the master BMC last updated the master heartbeat register and resets the master register to a reset state when the watchdog timer expires. The watchdog timer expires when the master BMC ceases updating the master heartbeat register and time has elapsed. During the reset state, the master BMC relinquishes control of the shared common resources and any one of the BMCs can elect to become a replacement master BMC.

According to another specific embodiment of the present disclosure, an information handling system may include a programmable logic (PL) switch. Each of the BMCs is connected to the PL switch via respective control/status lines for possible selection. The master register includes an output that provides select signals to the PL switch. The PL switch selects the control/status lines of the elected master BMC that provides the signals to control the plurality of the shared common resources.

According to another specific embodiment of the present disclosure, the information handling system includes the unelected BMCs which are identified as slave BMCs. The slave BMCs communicate with the master BMC via the control interconnects, delivering status and alerts to the master BMC. Each slave BMC polls the master register to read the unique identification of the master BMC stored in the master register and rely on the master BMC for the control of the shared common resources. On the other hand, the master BMC polls all of the slave BMCs and reads the status information from the slave BMCs that affects one or more operations of the shared common resources. The master BMC uses the status information to determine the operating parameters of the shared common resources. Thus, the master BMC controls, manages, and monitors the shared common resources in correlation with the polled status of the slave BMCs.

According to another specific embodiment of the present disclosure, the reset state indicates that the current master BMC is not active and relinquishes the mastership and that the master register is in condition to be written to. The reset state may include a predetermined reset identification or actual reset of the master register to zero. After receiving feedback indicating the reset state of the master register, a slave BMC writes to the master register an identification of the slave BMC to attempt to become the next master BMC, as a replacement to the previous master BMC. In another embodiment, a slave BMC may notify the master BMC to relinquish the mastership. In response, the master BMC ceases to update the master heartbeat register and thus triggers a reset condition of the master register to enable an election of the replacement master BMC. Yet in another embodiment, control logic of the master heartbeat register can force a reset state in the master register in response to a predetermined condition. The current master BMC is forced to relinquish the mastership of the shared common resources and a slave BMC may thereby elect to replace the current master BMC.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a system, and an information handling system for implementing a master baseboard management controller election and replacement sub-system that enables decentralized resource management in a multi-node information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware components and basic configuration depicted in the following figures may vary. For example, the illustrative components within information handling system 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system and a display device of or for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
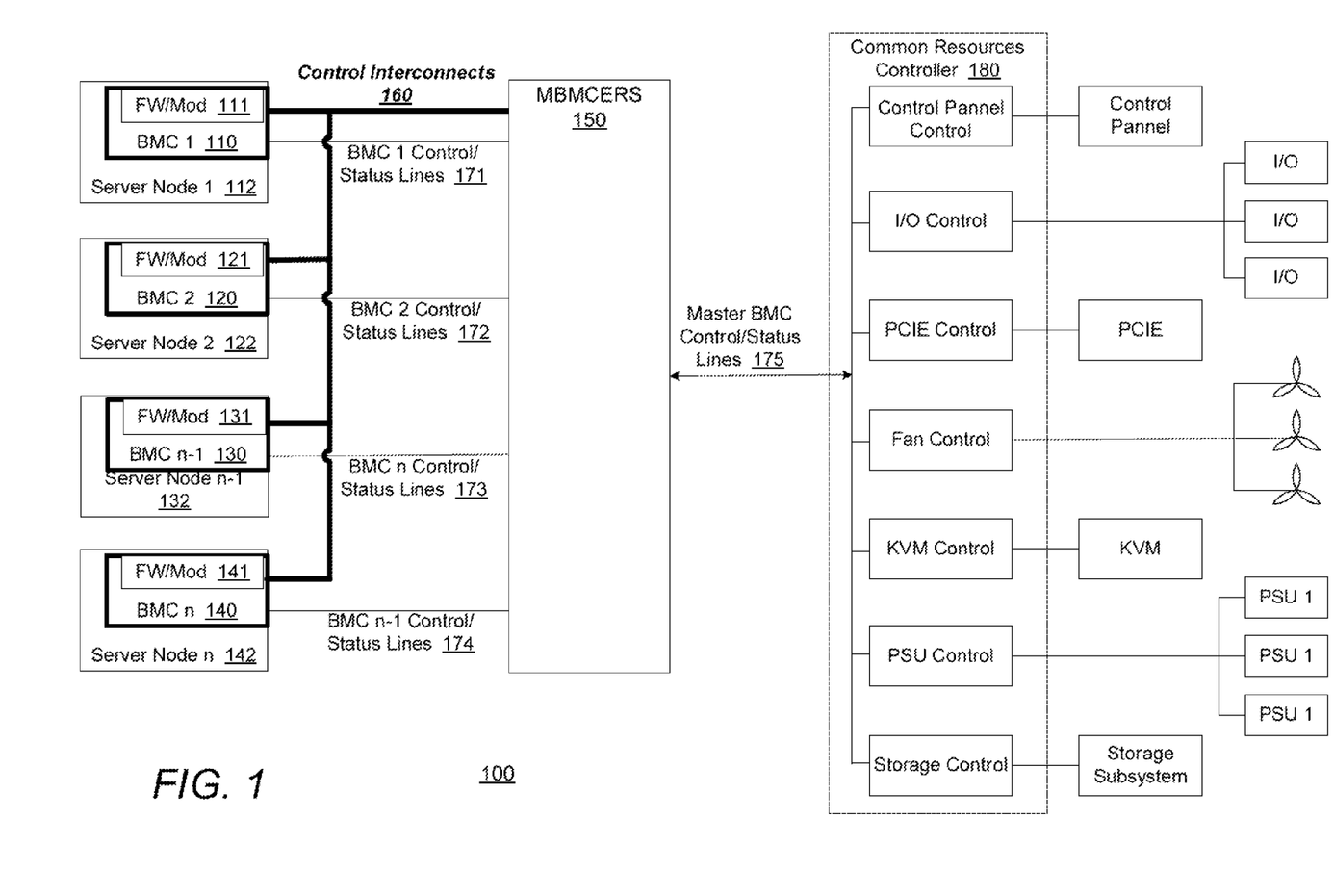
FIG. 1 provides a block diagram representation of an example information handling system within which a master baseboard management controller election and replacement sub-system can be implemented, according to one embodiment.

With reference now to the figures, and beginning with FIG. 1, there is depicted a block diagram representation of an example information handling system 100, within which one or more of the described features of the various embodiments of the disclosure can be implemented. Information handling system 100 includes a plurality of server nodes 112, 122, 132, and 142, which each have a respective baseboard management controller (BMC) 110, 120, 130, 140. Included in each of the BMCs is respective firmware (111, 121, 131, and 141) which includes software and/or firmware modules and sets of data that can be utilized during operations. These software and/or firmware modules can be executed within the BMC or in broader content of information handling system 100 and can be stored in a nonvolatile storage. Each BMC is embedded in respective server node (112, 122, 132, or 142) of the information handling system 100. Each BMC can communicate with one another and with master baseboard management controller election and replacement sub-system (MBMCERS) 150 via control interconnects 160. It is appreciated that a server node may have more than one BMC.

Each BMC is capable of controlling and communicating status of a plurality of shared common resources from a respective plurality of BMC control/status lines 171, 172, 173, and 174. However, only an elected master BMC has actual control of the shared common resources via master BMC control/status lines 175, which is selected from a plurality of BMC control/status lines 171, 172, 173, and 174. The shared common resources include but are not limited to control panel, input/output (I/O) devices, peripheral component interconnect express (PCIE), fans, keyboard video mouse (KVM), power supply unit (PSU), and storage subsystem. Each of the resources may couple with specialized control logics as control interface between the master BMC and the shared common resources. For example, an I/O device may require an I/O control in common resources controller 180. It is appreciated that some shared common resources may not require additional specialized control logics especially when the control logics are built in the specific devices. The control logics may be grouped together as common resource controller 180. Since each BMC is capable of controlling the shared common resources, each BMC may be elected as the master BMC. The control of the shared common resources is decentralized to an elected master BMC which may be replaceable by another BMC when the current master BMC relinquishes its mastership. Only one of the BMCs is elected as the master BMC. The remaining non-elected BMCs take on the role of slave BMCs that do not have control of the shared common resources, but are capable of communicating to the master BMC via control interconnects 160. The slave BMCs defer the control of the shared common resources to the master BMC. It is appreciated that control interconnects 160 are a shared multi-master bus that communicates with other peers and/or agents on the shared multi-master bus.

Figure 2:
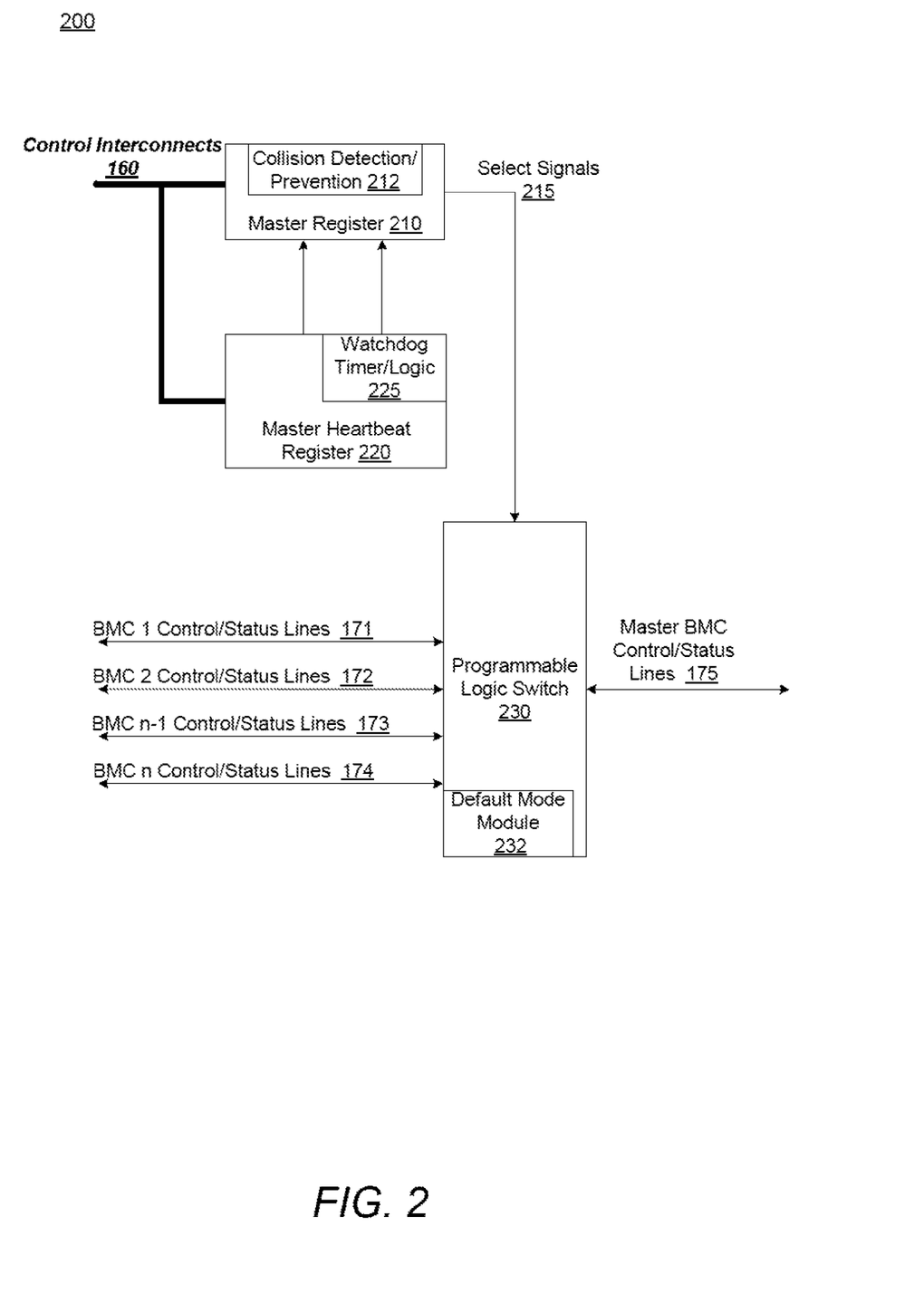
FIG. 2 illustrates the component makeup of a master baseboard management controller election and replacement sub-system, in accordance with one or more embodiments.

FIG. 2 illustrates a master baseboard management controller election and replacement sub-system (MBMCERS) 200. The MBMCERS 200 includes a master register 210, a master heartbeat register 220, and a programmable logic switch (PL switch) 230. The master register 210 stores the identification of the master BMC. Once the master BMC has been selected, the identification of the master BMC is stored in the master register 210 indicating that a master BMC has been elected and the master register 210 is readable but cannot be written to. The master register 210 has an output that provides select signals 215 to the programmable logic (PL) switch 230. Each of the BMCs control/status lines 171, 172, 173 and 174 are connected to PL switch 230. Based on the value of the select signals 215, the PL switch 230 selects, from the plurality of BMCs control/status lines, the control/status lines of the elected master BMC and connects the selected master BMC's control/status lines with master BMC control/status lines 175 that provide control signals for/to the shared common resources. It is appreciated that the plurality of BMCs control/status lines may include various types of busses, interfaces, and/or signals for purposes inclusive of control, monitoring, and bidirectional data transfer. The remaining sets of BMC control/status lines that are not selected are available for subsequent selection when a replacement master BMC is required. The select signals 215 indicate to the PL switch 230 which BMC is the elected master BMC and the PL switch 230 selects the control/status lines of the elected master BMC corresponding to the select signals 215. It is appreciated that the common resource controller 180 (FIG. 1) may reside in PL switch 230. It is also appreciated that, when no BMC is able to assert as a master, master register 210 remains at a reset state. Select signals 215 are also in reset state, and a default mode is invoked. When a default mode is invoked, certain pre-programmed default operations can be implemented, for example, the fans may run on high, the display may have a preconditioned message or blink pattern, the KVM is disabled, etc. In one embodiment, a default mode module 232 provides the control signals to the shared common resources during a default. Default mode module 232 may reside in PL switch 230.

Since each slave BMC polls and reads the master register 210 and in order to avoid/prevent concurrent or overlapping access to the master register, master register 210 includes collision detection and prevention module 212, which allows only a single BMC to access the master register 210 at any time. The slave BMCs are thus only allowed to access the master register 210 sequentially, one at a time. On the other hand, it is appreciated that in certain conditions and/or in alternate embodiments, the MBMCERS 200 can allow the slave BMCs to concurrently share the content of master register 210. The master register 210 is connected via one or more inputs to the master heartbeat register 220. The master heartbeat register 220 indicates the active status of the master BMC. The master BMC periodically updates the master heartbeat register 220 to provide active status and to prevent watchdog timer 225 from expiring. Watchdog timer 225 tracks the elapsed time since the master BMC last updated the master heartbeat register 220. When the elapsed time is greater than a pre-established period of time, watchdog timer 225 resets the master register 210 to a reset state indicating that the master BMC has not been updating the master heartbeat register 220 and that the master BMC has thus relinquished the mastership of the shared common resources. When the master register 210 is in the reset state, any one of the BMCs can elect to become a replacement master BMC. It is appreciated that the master heartbeat register 220 and watchdog timer 225 may include additional logics to support the reset state. It is further appreciated that the master register is readable via control interconnects 160; however, master register 210 is accessible to be written to only during a reset state.

Figure 3:
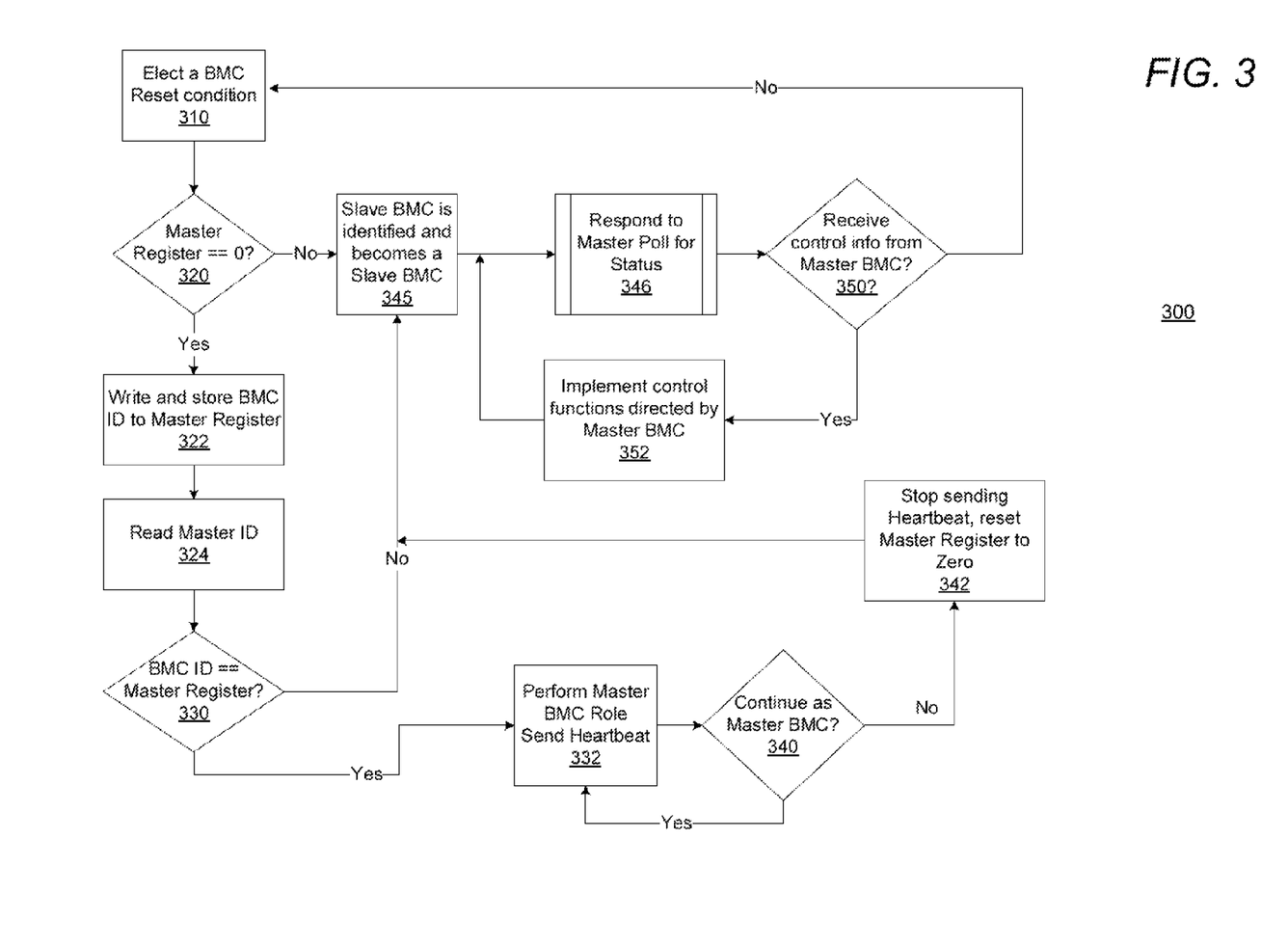
FIG. 3 is a flow chart illustrating processes within a method for electing a master BMC and replacing a master BMC.

FIG. 3 is a flow chart 300 illustrating an exemplary method for electing a master BMC in an information handling system. Starting at block 310, the master register 210 is in a reset state for an election of a master BMC. An electable BMC reads master register and compares the value latched within the master register to a reset state value (e.g., zero) (decision block 320). It is appreciated that the reset state has a predetermined value. The present example utilizes zero as the value for the reset state, although other values are possible in other examples. If the master register 210 is in a reset state, the BMC may elect to become a master BMC by writing its unique BMC identification to the master register 210 (block 322). To verify that the BMC has indeed been elected the master BMC, the BMC reads (block 324) back the content in the master register 210 and compares (decision block 330) the read content to its own BMC identification. If the content of the master register is the BMC identification, then the new master BMC has been elected and can proceed to take over the mastership of the shared common resources (block 332). The master BMC controls the shared common resources and performs other master roles. Moreover, the master BMC must periodically provide updates to master heartbeat register 220 as maintenance to continue as the master BMC (decision block 340). Failing to update the master heartbeat register, the master BMC will relinquish the mastership, and the master register 220 is reset to zero as shown in block 342. Furthermore in block 345, the relinquished master BMC will commence operating as a slave BMC.

However, at decision block 330, if the content read from the master register does not match the BMC identification, then the BMC has not been elected as the master BMC. The BMC has been identified as a slave BMC and should proceed to take the role of a slave BMC (block 345). A slave BMC responds to the polling of the master BMC for the status of the server nodes (block 346). The slave BMC provides status information to the master BMC. The slave BMC may also receive (decision block 350) information such as the status of the shared common resources from the master BMC. When a slave BMC receives directions from the master BMC, the slave BMC implements the functions directed by the master BMC (block 352). On the other hand, if a slave BMC receives information that the master BMC has relinquish the mastership, the slave BMC tries to become elected as the next master BMC (block 310).

Figure 4:
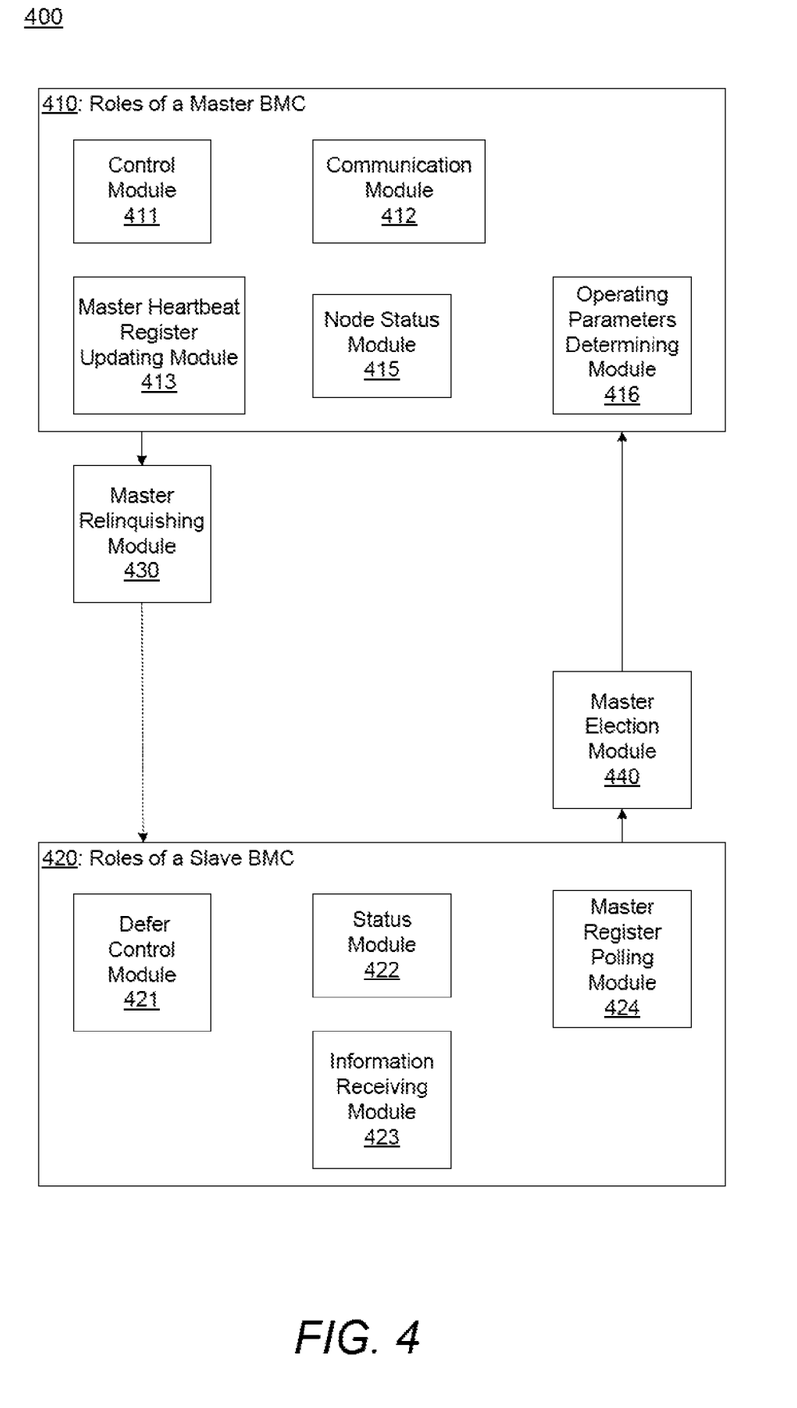
FIG. 4 provides block diagram representations of the roles of a master BMC and roles of a slave BMC, according to one or more embodiments.

FIG. 4 is a block diagram 400 illustrating master roles 410 and slave roles 420 of a BMC in an information handling system. Each BMC can be elected as a master BMC or can become a slave BMC (e.g., when a different BMC is elected as the master). It is appreciated that the firmware/software modules that execute the master role and/or slave role of MBMCERS may reside in the respective firmware 111, 121, 131, and 141 of each BMC. As a master BMC, the BMC takes on a master role having the mastership of the shared common resources. The master BMC includes control module 411 that controls the shared common resources and further includes the following modules: communication module 412 for communicating with other BMCs on the control interconnects; master heartbeat register updating module 413; node status module 415, which polls the status of the slave BMC; and operating parameters determining module 416, which determines the operating parameters to be applied to the shared common resources. In one embodiment, master BMC also includes or supports master relinquishing module 430 by which a master BMC is able to relinquish the mastership of the control of the shared common resources. Included within the master relinquishing module 430 is the functionality that allows a master BMC to be able to transition to a slave BMC and take on a slave role once the mastership is relinquished and another BMC is elected as the next master BMC.

Each of the BMCs can communicate with each other and/or read/write the master register 210 via control interconnects 160. It is appreciated that control interconnects 160 may be utilized to provide or establish a communication channel through different protocols such as I2C, SPI, Ethernet, serial, etc. The master BMC will request each of the slave BMCs to provide the health status of each of the respective server nodes. Each of the slave BMCs will provide the health status of the respective server node. The health status includes monitored information received from selective sensors and/or a monitoring sub-system built into the server node. The master BMC additionally receives status information of the shared common resources. Having received the reports and statuses, the master BMC determines (or calculates) the operating parameters of the shared common resources corresponding to the respective statuses of the BMCs and shared common resources. Furthermore, the master BMC will fetch the status of the shared common resources and provide the operating parameters and status of the shared common resources to the slave BMC. In return, the slave BMC receives the operating parameter information and status of the shared common resources as feedback of the operating status of the shared common resources. It is appreciated that some shared common resources may have sensors and built-in monitoring devices. The master BMC also updates master heartbeat register 220 periodically utilizing a predetermined interval (e.g., 1 second). If a write is not received at the heartbeat register 220 within a predetermined stretch of time (i.e., before the expiration of the predetermined interval, e.g., 10 seconds), then master register 210 is reset, indicating that there is no master BMC.

Turning now to descriptions of exemplary slave roles 420 of a BMC in an information handling system, the slave BMC includes a defer control module 421 which enables the BMC to recognize that it is a slave and to thus rely on a master BMC to control the shared common resources. The slave BMC further includes status module 422 that provides status of the health of the respective server node, information receiving module 423 that receives information from the master BMC, master register polling module 424 that routinely reads the master register to verify that there is an active master, and master election module 440 for electing the slave BMC to a master BMC when the current master BMC relinquishes its mastership.

Since each slave BMC will routinely poll and read the master register 210, master register 210 includes collision detection and prevention module 212 to avoid concurring access of master register 210 and insure consecutive access. If a reset value is read, the slave BMC can elect, via execution of the master election module 440, to become a master by writing its BMC identification to the master register 210. The master register 210 will accept a write during a reset state. Once a BMC identification is written to the master register 210, the master register 210 can be polled for the stored identification, but cannot be written over until the master register 210 is in a reset state, thus a race condition for a master election is avoided.

Figure 5:
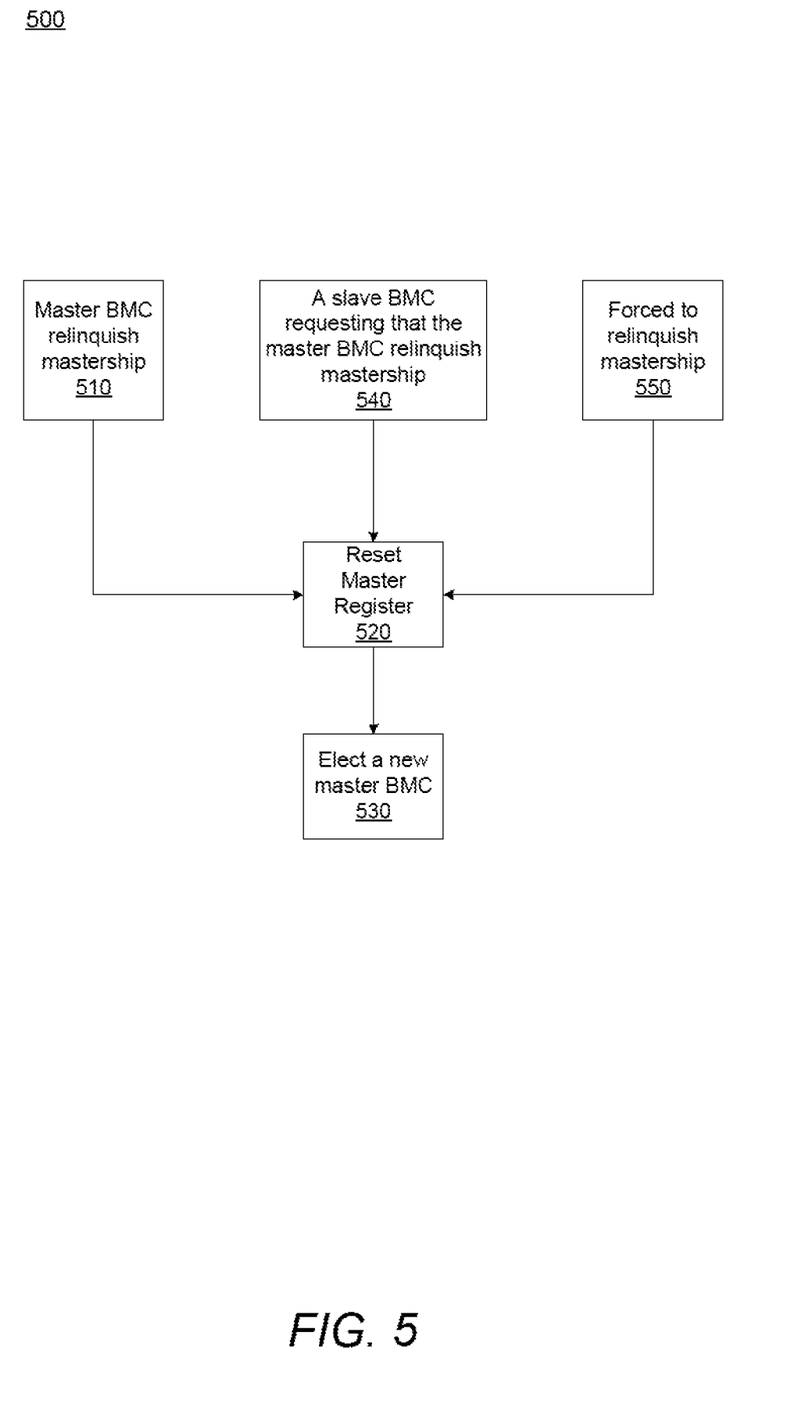
FIG. 5 is a flow chart illustrating processes within different methods for triggering a reset state of the master BMC, according to one embodiment.

FIG. 5 is a flow diagram 500 illustrating processes within different requests that initiate or trigger a reset state of the master register. According to one embodiment, master register 210 cannot be written to and/or accept a write operation unless the master register is in a reset state. A reset state of a master register 210 indicates that there is no active master and any BMC may be elected a master. If a master BMC has been elected, the master BMC may decide to relinquish its mastership (block 510). For a master BMC to relinquish its mastership, the master BMC stops updating the master heartbeat register 220, which causes an expiration of the watchdog timer 225. The expired watchdog timer 225 will reset the master register 210 and thus triggers a reset state of the master register (block 520). Another BMC may elect in block 530 to become the next master by writing its BMC identification to master register 210 during the reset state.

In another embodiment, a reset state may also be requested from a slave BMC (block 540). Because a slave BMC defers control to the master BMC, the slave BMC waits for the master BMC to relinquish the mastership. The slave will receive feedback indicating that the master register has gone into a reset state.

In an environment of a high density server with multiple server nodes in an information handling system, a reset request that is not initiated from a master or slave BMC may require that the current master surrenders its mastership in certain predetermined conditions (block 550). It is appreciated that a chassis logic or a subsystem controller may request such reset. Under predetermined conditions, heartbeat register can force a reset state. When the master register 210 is forced into a reset state (block 520), a new master BMC will be elected (block 530). It is appreciated that if a new master BMC is not elected, the default mode module 232 takes over the control of the master BMC control/status lines 175.

In the above described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   a plurality of server nodes, wherein each of the plurality of server nodes comprises a baseboard management controller (BMC) capable of controlling shared common resources among the plurality of server nodes, and wherein each BMC has a unique BMC identification;
   a programmable logic (PL) switch coupled to each BMC and to a plurality of shared common resources and which enables an identified master BMC to communicate with and control the shared common resources;
   a master baseboard management controller election and replacement sub-system (MBMCERS) that enables decentralized resource management control via the identified master BMC, the MBMCERS comprising:
      a master register which stores the unique identification of the BMC that is the identified master BMC to control shared common resources; and
      a master heartbeat register that receives periodic updates from the identified master BMC;
      a watchdog timer that tracks an elapsed time since the master BMC last updated the master heartbeat register and triggers a reset of the master register to a reset state when the watchdog timer expires without the identified master BMC writing to the master heartbeat register, wherein the master BMC relinquishes control of the shared common resources when the master register is placed in the reset state, and wherein when the master register is in the reset state, any one of the BMCs can elect to become a replacement master BMC.

2. The information handling system of claim 1 further comprising:
   logic that supports the watchdog timer and master heartbeat register and resets the master register to a reset state in response to the watchdog timer expiring without the master BMC writing to the master heartbeat register.

3. The information handling system of claim 2, wherein in response to a pre-established condition, the logic forces the master register into the reset state whereby the current master BMC is forced to relinquish the mastership of the shared common resources and the master register is forced into the reset state to enable an election of the replacement master BMC.

4. The information handling system of claim 2, wherein after receiving feedback indicating the master register is in the reset state, a next BMC writes to the master register an identification of the next BMC to attempt to become the replacement master BMC.

5. The information handling system of claim 4, wherein the next BMC takes over as the replacement master BMC after verifying that the identification stored in the master register is the identification of the next BMC.

6. The information handling system of claim 5, further comprising control interconnects communicatively coupled among all the BMCs, the master register and the master heartbeat register.

7. The information handling system of claim 1, wherein the master register includes an output that provides select signals to the PL switch to select one set of control/status lines to receive control/status signals from, wherein the PL switch selects control/status lines of the identified master BMC, and wherein the selected control/status lines of the master BMC control the plurality of shared common resources.

8. The information handling system of claim 1, wherein each BMC that is not the master BMC is identified as a slave BMC and each slave BMC polls the master register to read the unique identification of the master BMC stored in the master register and rely on the master BMC to control the shared common resources.

9. The information handling system of claim 8, wherein in response to a slave BMC requesting the master BMC relinquish the mastership, the master BMC ceases to update the master heartbeat register, which triggers the master register to enter the reset state to enable an election of the replacement master BMC.

10. The information handling system of claim 1, wherein the reset state includes a predetermined reset identification that indicates that the current master BMC is not active or has relinquished the mastership and that the master register is in condition to be written to.

11. The information handling system of claim 1, wherein the master BMC polls at least one slave BMC and reads a status of the at least one slave BMC that affects one or more operations of the shared common resources, and wherein the master BMC controls the shared common resources in correlation with the polled status of the at least one slave BMC.

12. The information handling system of claim 1, wherein the shared common resources include shared infrastructures comprising one or more of sensors, fans, power supplies, keyboard video mouse (KVMs), shared storage, and shared input/output (I/O) subsystems.

13. The information handling system of claim 1, further comprising a collision detection and prevention module wherein each of a plurality of slave BMCs consecutively reads the contents of the master BMC one at a time.

14. The information handling system of claim 1, wherein the master register is accessible to be written to only during a reset condition.

15. In an information handling system having a plurality of server nodes, each having a baseboard management controller (BMC), and shared common resources, a method of enabling decentralized management and control of the shared common resources, the method comprising:

electing a master BMC from among multiple BMCs of the plurality of server nodes, wherein each BMC is capable of controlling shared common resources when elected as the master BMC, and wherein each BMC has a unique BMC identification;

storing the identification of the elected master BMC in a master register;

wherein the master register includes an output that provides select signals to a programmable logic (PL) switch coupled to each BMC and the shared common resources;

performing the management and control of the shared common resources via the elected master BMC and the PL switch; and the elected master BMC periodically updating a master heartbeat register to indicate that the elected master BMC continues to provide the management and control of the shared common resources, wherein the periodic update of the master heartbeat register refreshes the watchdog timer to enable the master BMC to maintain control of the shared common resources.

16. The method of claim 15, further comprising:

verifying that the master BMC has been elected;

selecting control/status lines of the master BMC, wherein the selected control/status lines of the master BMC provides signals which control the shared common resources;

controlling the shared common resources through the use of the control/status lines;

identifying each BMC that is not elected as the master BMC as a slave BMC; and each slave BMC polling the master register to read the unique identification of the master BMC stored in the master register and relying on the master BMC to control the shared common resources.

17. The method of claim 16, further comprising:

detecting when the BMC master relinquishes control of the shared common resources based on a reading of the master register.

18. The method of claim 17, further comprising:

in response to detecting that a previous master BMC has relinquished the master role, electing a replacement master BMC by:
  resetting the master register to a reset state that enables the master register to be written to and to store a replacement master BMC identification;
  writing to the master register the identification of the slave BMC elected as the replacement master BMC; and
  verifying that the identification stored in the master register is the identification of the replacement master BMC, whereby the replacement master BMC takes control of the shared common resources.

19. The method of claim 16, further comprising:

polling a status of each slave BMC, wherein each BMC has sensors built in a respective server node that require monitoring;

determining, from the polled status of all the BMCs, operating parameters of the shared common resources; and the master BMC generating control/status signals from the determined operating parameters and forwarding the control/status signals via the PL switch to control the shared common resources in correlation with calculated operating parameters of the shared common resources.

20. The method of claim 19, further comprising:

the master BMC providing the operating parameters and status of the shared common resources to each slave BMC; and each slave BMC receiving the operating parameters and status of the shared common resources via control interconnects communicatively coupled among all the BMCs, the master register and the master heartbeat register.

21. A master baseboard management controller election and replacement sub-system (MBMCERS) comprising:

a master register which stores a unique identification of a baseboard management controller (BMC) that has been elected as a master BMC, wherein the master BMC controls shared common resources among a plurality of server nodes wherein each of the plurality of server nodes comprises a BMC capable of controlling the shared common resources, and wherein each BMC has a unique BMC identification;

a master heartbeat register that indicates the active status of the master BMC having mastership of the shared common resources that enables decentralized resource management control which includes a watchdog timer that tracks an elapsed time since the master BMC last updated the master heartbeat register;

logic that resets the master register to a reset state when the watchdog timer expires without the master BMC writing to the master heartbeat register, whereby the master BMC periodically updates the master heartbeat register and refreshes the watchdog timer to maintains control of the shared common resources, and wherein the master BMC relinquishes control of the shared common resources when the master register is placed in the reset state, and wherein any one of the BMCs can elect to become a replacement master BMC when the master register is in a reset condition, wherein the watchdog timer tracks an elapsed time since the master BMC last updated the master heartbeat register and triggers a reset of the master register to a reset state when the watchdog timer expires; and a programmable logic (PL) switch communicatively coupled to each BMC via respective sets of control/status lines and to a plurality of shared common resources, wherein the master register includes an output that provides select signals to the PL switch to select one set of control/status lines to receive control signals from, wherein the PL switch selects control/status lines of the master BMC, and wherein the selected control/status lines of the master BMC control the shared common resources.

22. The MBCERS of claim 21, further comprising:

control interconnects communicatively coupled among all the BMCs, the master register and the master heartbeat register;

wherein each slave BMC relies on the master BMC to control the shared common resources and polls the master register; and wherein the master BMC requests status from each of the slave BMCs wherein the master BMC receives the status of the corresponding server nodes and calculates operating parameters of the shared common resources that are transmitted via the selected control/status lines.

* * * * *